United States Patent [19]
Powell et al.

[11] Patent Number: 6,117,356
[45] Date of Patent: Sep. 12, 2000

[54] REFRIGERANT COMPOSITIONS

[75] Inventors: Richard L Powell; Stuart Corr; Frederick T Murphy; James D Morrison, all of Cheshire, United Kingdom

[73] Assignee: Imperial Chemical Industries PLC, London, United Kingdom

[21] Appl. No.: 09/242,807

[22] PCT Filed: Aug. 18, 1997

[86] PCT No.: PCT/GB97/02198

§ 371 Date: May 7, 1999

§ 102(e) Date: May 7, 1999

[87] PCT Pub. No.: WO98/08912

PCT Pub. Date: Mar. 5, 1998

[30] Foreign Application Priority Data

Aug. 30, 1996 [GB] United Kingdom .................... 9618207

[51] Int. Cl.$^7$ ...................................................... C09K 5/04
[52] U.S. Cl. ................................................ 252/67; 62/114
[58] Field of Search ................................. 252/67; 62/114

[56] References Cited

U.S. PATENT DOCUMENTS 5,736,063  4/1998  Richard et al. ............................ 252/67

FOREIGN PATENT DOCUMENTS

| 299 614 | 1/1989 | European Pat. Off. . |
|---|---|---|
| 509 673 | 10/1992 | European Pat. Off. . |
| 632 002 | 1/1995 | European Pat. Off. . |
| 4116274 | 11/1992 | Germany . |
| 2-272086 | 11/1990 | Japan . |
| 92/16597 | 10/1992 | WIPO . |
| 94/17153 | 8/1994 | WIPO . |
| 96/02604 | 2/1996 | WIPO . |
| 96/02606 | 2/1996 | WIPO . |
| 96/03472 | 2/1996 | WIPO . |
| 96/03473 | 2/1996 | WIPO . |

OTHER PUBLICATIONS

Chemical Abstracts, AN 129:124258, "Ternary mixture as R22 replacement in heat pumps", Maczek et al., no month available 1997.

*Primary Examiner*—Christine Skane
*Attorney, Agent, or Firm*—Pillsbury Madison & Sutro LLP

[57] ABSTRACT

A composition is described which comprises carbon dioxide ($CO_2$), at least one hydrofluorocarbon selected from the group consisting of 1,1,1,2tetrafluoroethane (R-134a), 1,1,2,2-tetrafluoroethane (R-134) and 1,1difluoroethane (R-152a), and at least one hydrofluorocarbon selected from the group consisting of 1,1,1,3,3,3-hexafluoropropane (R-236fa) and 1,1,1,2,3,3-hexafluoropropane (R-236ea). The composition may additionally comprise at least one hydrocarbon and can be used as a replacement for refrigerant R-12 in automobile air conditioning and domestic refrigeration systems.

15 Claims, No Drawings

REFRIGERANT COMPOSITIONS

This invention relates to compositions which are suitable for refrigeration applications and to the use of such compositions in heat transfer devices such as refrigeration and air conditioning systems. The invention relates, in particular, to refrigerant compositions which can be used in the applications currently satisfied by dichlorodifluoromethane (refrigerant R-12).

Heat transfer devices of the mechanical compression type such as refrigerators, freezers, heat pumps and air conditioning systems are well known. In such devices a refrigerant liquid of a suitable boiling point evaporates at low pressure taking heat from a neighbouring heat transfer fluid. The resulting vapour is then compressed and passes to a condenser where it condenses and gives off heat to another heat transfer fluid. The condensate is then returned through an expansion valve to the evaporator so completing the cycle. The mechanical energy required for compressing the vapour and pumping the liquid may be provided by an electric motor or an internal combustion engine.

In addition to having a suitable boiling point and a high latent heat of vaporisation, the properties preferred of a refrigerant include low toxicity, non-flammability, non-corrosivity, high stability and freedom from objectionable odour.

Hitherto, heat transfer devices have tended to use fully and partially halogenated chlorofluorocarbon refrigerants such as bromotrifluoromethane (refrigerant R-13B1), trichlorofluoromethane (refrigerant R-11), dichlorodifluoromethane (refrigerant R-12), chlorodifluoromethane (refrigerant R-22) and the azeotropic mixture of chlorodifluoromethane and chloropentafluoroethane (refrigerant R-115); the azeotrope being refrigerant R-502. Refrigerant R-12, for example, has been widely used in automobile air conditioning and domestic refrigeration systems.

However, the fully halogenated chlorofluorocarbons in particular have been implicated in the destruction of the earth's protective ozone layer and as a result the use and production thereof has been limited by international agreement.

Whilst heat transfer devices of the type to which the present invention relates are essentially closed systems, loss of refrigerant in the atmosphere can occur due to leakage during operation of the equipment or during maintenance procedures. It is important, therefore, to replace fully halogenated chlorofluorocarbon refrigerants by materials having low or zero ozone depletion potentials.

In addition to the possibility of ozone depletion, it has been suggested that significant concentrations of chlorofluorocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals.

Replacements for some of the chlorofluorocarbon refrigerants presently in use have already been developed. These replacement refrigerants tend to comprise selected hydrofluoroalkanes, i.e. compounds which contain only carbon, hydrogen and fluorine atoms in their structure. Thus, refrigerant R-12 is generally being replaced by 1,1,1,2-tetrafluoroethane (R-134a).

Although suitable replacement refrigerants are available, there is still a need for new refrigerants having a low or zero ozone depletion potential that are capable of replacing the chlorofluorocarbon refrigerants presently in use such as R-12. Furthermore, very real benefits could be realised by a new replacement refrigerant having a higher refrigeration capacity than the chlorofluorocarbon refrigerant it is replacing.

The present invention provides a composition comprising a mixture of compounds having zero ozone depletion potentials which can be used as a replacement for refrigerant R-12 in the automobile air conditioning and domestic refrigeration systems. The composition of the invention can exhibit an advantageously high refrigeration capacity.

According to the present invention there is provided a composition comprising:

(A) at least one compound selected from the group consisting of carbon dioxide ($CO_2$) and the hydrofluorocarbons having a boiling point in the range of from −80° C. to −40° C.;

(B) at least one hydrofluorocarbon selected from the group consisting of 1,1,1,2-tetrafluoroethane (R-134a), 1,1,2,2-tetrafluoroethane (R-134) and 1,1-difluoroethane (R-152a); and (C) at least one hydrocarbon selected from the group consisting of 1,1,1,1,3,3,3-hexafluoropropane (R-236fa) and 1,1,1,2,3,3-hexafluoropropane (R-236ea).

The present invention also provides a heat transfer device, such as an automobile air conditioning or domestic refrigeration system, comprising an evaporator, a condenser, a compressor and an expansion valve in which there is contained a refrigerant composition comprising:

(A) at least one compound selected from the group consisting of carbon dioxide ($CO_2$) and the hydrofluorocarbons having a boiling point in the range of from −80° C. to −40° C.;

(B) at least one hydrofluorocarbon selected from the group consisting of 1,1,1,2-tetrafluoroethane (R-134a), 1,1,2,2-tetrafluoroethane (R-134) and 1,1-difluoroethane (R-152a); and (C) at least one hydrofluorocarbon selected from the group consisting of 1,1,1,3,3,3-hexafluoropropane (R-236fa) and 1,1,1,2,3,3-hexafluoropropane (R-236ea).

The composition of the invention comprises at least three separate components.

The first component (component (A)) comprises at least one compound selected from carbon dioxide ($CO_2$), which exhibits a low temperature refrigeration action subliming at around −78.5° C., and the hydrofluorocarbons having a boiling point in the range of from −80° C. to −40° C. When $CO_2$ forms part of the composition of the invention it will, of course, behave as a high pressure refrigerant component. Preferred hydrofluorocarbons for component (A) are those having a boiling point in the range of from −60° C. to −40° C., with hydrofluorocarbons having a boiling point in the range of from −55° C. to −45° C. being particularly preferred. Although component (A) may comprise a mixture of $CO_2$ and a hydrofluorocarbon(s), compositions of the invention in which component (A) is either $CO_2$ or a hydrofluorocarbon(s) are preferred. Moreover, although component (A) may comprise a mixture of two or more hydrofluorocarbons, it will preferably comprise just one such compound.

Suitable hydrofluorocarbons for component (A) may be selected from difluoromethane (R-32), 1,1,1-trifluoroethane (R-143a) and pentafluoroethane (R-125) which have boiling points of about −51.6° C., −47.6° C. and −48.5° C. respectively. Preferred hydrofluorocarbons for component (A) are selected from R-32 and R-125, with R-32 being particularly preferred.

The second component (component (B)) comprises at least one hydrofluorocarbon selected from 1,1,1,2-tetrafluoroethane (R-134a), 1,1,2,2-tetrafluoroethane (R-134) and 1,1-difluoroethane (R-152a) which have boiling points of about −26.5° C., −19.7° C. and −24.7° C. respectively. Preferably component (B) is R-134a or a mixture thereof with R-134, and in an especially preferred embodiment component (B) is R-134a.

The third component (component (C)) comprises at least one hydrofluorocarbon selected from 1,1,1,3,3,3-hexafluoropropane (R-236fa) and 1,1,1,2,3,3-hexafluoropropane (R-236ea) which have boiling points of about −1° C. and 6.5° C. respectively. Although component (C) may comprise a mixture of R-236fa and R-236ea, it will preferably comprise just one of these compounds.

Accordingly, a particularly preferred composition of the invention is one comprising:

(A) $CO_2$ or R-32;

(B) R-134a; and (C) R-236fa or R-236ea.

The amounts of components (A), (B) and (C) in the composition of the invention may be varied within wide limits and will depend, inter alia, on whether the composition contains $CO_2$ on a hydrofluorocarbon(s) having a boiling point of from −80° C. to −40° C. as component (A). However, typically the composition will comprise from 1 to 30% by weight of component (A), from 60 to 97% by weight of component (B) and from 1 to 30% by weight of component (C).

When component (A) is $CO_2$ and component (B) is R-134a, a preferred composition of the invention in terms of its suitability as a replacement for refrigerant R-12 is one comprising from 1 to 10% by weight of $CO_2$, from 75 to 97% by weight of R-134a and from 1 to 20% by weight of R-236fa, R-236ea or a mixture thereof.

When component (A) is $CO_2$ and component (B) is R-134a, a particularly preferred composition of the invention in terms of its suitability as a replacement for refrigerant R-12 is one comprising from 1 to 7% by weight, more particularly from 1 to 5% by weight, of $CO_2$, from 30 to 97% by weight, more particularly from 85 to 97% by weight, of R-134a and from 2 to 15% by weight, more particularly from 2 to 13% by weight, of R-236fa, R-236ea or a mixture thereof.

When component (A) is $CO_2$ and component (B) is R-134a, an especially preferred composition of the invention in terms of its suitability as a replacement for refrigerant R-12 is one comprising about 2% by weight of $CO_2$, about 95% by weight of R-134a and about 3% by weight of R-236fa. This composition has a higher refrigeration capacity than refrigerant R-12 and a comparable coefficient of performance.

When component (A) is $CO_2$ and component (B) is R-134a, another especially preferred composition of the invention in terms of its suitability as a replacement for refrigerant R-12 is one comprising about 2% by weight of $CO_2$, about 91% by weight of R-134a and about 7% by weight of R-236ea. This composition has a higher refrigeration capacity than refrigerant R-12 and a similar coefficient of performance.

When component (A) is a hydrofluorocarbon(s) having a boiling point in the range of from −80° C. to −40° C. and component (B) is R-134a, a preferred composition of the invention in terms of its suitability as a replacement for refrigerant R-12 is one comprising from 1 to 20% by weight of that hydrofluorocarbon, from 75 to 95% by weight of R-134a and from 1 to 20% by weight of R-236fa, R-236ea or a mixture thereof.

When component (A) is a hydrofluorocarbon(s) having a boiling point in the range of from −80° C. to −40° C. and component (B) is R-134a, a particularly preferred composition of the invention in terms of its suitability as a replacement for refrigerant R-12 is one comprising from 2 to 15% by weight, more particularly from 3 to 12% by weight, of that hydrofluorocarbon, from 75 to 95% by weight, more particularly from 80 to 90% by weight, of R-134a and from 2 to 15% by weight, more particularly from 3 to 12% by weight, of R-236fa, R-236ea or a mixture thereof.

When component (A) is R-32 and component (B) is R-134a, an especially preferred composition of the invention in terms of its suitability as a replacement for refrigerant R-12 is one comprising about 10% by weight of R-32, about 85% by weight of R-134a and about 5% by weight of R-236fa, R-236ea or a mixture thereof. These compositions have a higher refrigeration capacity than refrigerant R-12 and a similar coefficient of performance.

When component (A) is R-32 and component (B) is R-134a, another especially preferred composition of the invention in terms of its suitability as a replacement for refrigerant R-12 is one comprising about 5% by weight of R-32, about 85% by weight of R-134a and about 10% by weight of R-236fa, R-236ea or a mixture thereof. These compositions have a similar refrigeration capacity and coefficient of performance to R-12.

When the composition of the invention is to be used as a refrigerant, it may be combined with one or more hydrocarbons in an amount which is sufficient to allow the composition to transport a mineral oil or alkyl benzene type lubricant around a refrigeration circuit and return it to the compressor. In this way, inexpensive lubricants based on mineral oils or alkyl benzenes may be used to lubricate the compressor.

Suitable hydrocarbons for inclusion in the refrigerant composition of the invention are those containing from 2 to 6 carbon atoms, with hydrocarbons containing from 3 to 5 carbon atoms being preferred. Hydrocarbons that will not significantly alter the thermophysical properties of the refrigerant at the level at which they provide for oil transport, such as the linear and branched isomers of butane and pentane are particularly preferred, with pentane being especially preferred.

Where a hydrocarbon is included, it will preferably be present in an amount of from 1 to 10% by weight on the total weight of the composition.

The refrigerant composition of the invention may also be used in combination with the types of lubricants which have been specially developed for use with hydrofluorocarbon based refrigerants. Such lubricants include those comprising a polyoxyalkylene glycol base oil. Suitable polyoxyalkylene glycols include hydroxyl group initiated polyoxyalkylene glycols, e.g. ethylene and/or propylene oxide oligomers/polymers initiated on mono- or polyhydric alcohols such as methanol, butanol, pentaerythritol and glycerol. Such polyoxyalkylene glycols may also be end-capped with suitable terminal groups such as alkyl, e.g. methyl groups. Another class of lubricants which have been developed for use with hydrofluorocarbon based refrigerants and which may be used in combination with the present refrigerant compositions are those comprising a neopentyl polyol ester base oil derived from the reaction of at least one neopentyl polyol and at least one aliphatic carboxylic acid or an esterifiable derivative thereof. Suitable neopentyl, polyols for the formation of the ester base oil include pentaerythritol, polypentaerythritols such as di and tripentacrythritol, trimethylol alkanes such as trimethylol ethane and trimethylol propane, and neopentyl glycol. The esters may be formed with linear and/or branched aliphatic carboxylic acids, such as linear and/or branched alkanoic acids. Preferred acids are selected from the C, particularly the C, linear alkanoic acids and the C, particularly the C, branched alkanoic acids. A minor proportion of an aliphatic polycarboxylic acid, e.g. an aliphatic dicarboxylic acid, may also be used in the synthesis of the ester in order to increase the viscosity thereof. Usually, the amount of the carboxylic acid(s) which is used in the synthesis will be sufficient to esterify all of the hydroxyl groups contained in the polyol, although residual hydroxyl functionality may be acceptable.

The single component refrigerants and azeotropic refrigerant blends which are used in conventional heat transfer devices boil at a constant temperature in the evaporator under constant pressure conditions, and so produce an essentially constant temperature profile across the evaporator. The temperature of the heat transfer fluid being cooled, which may be air or water for example, drops fairly rapidly on first contacting the cold surfaces provided by the refrigerant evaporating in the evaporator owing to the large difference in temperature between that fluid and the evaporating refrigerant. However, since the temperature of the heat transfer fluid is progressively reduced as it passes along the length of the evaporator, there is a progressive reduction in the temperature differential between the fluid and the evaporating refrigerant and a consequent reduction in the heat transfer or cooling rate.

In contrast, the refrigerant composition of the invention is a non-azeotropic (zeotropic) composition which tends to boil over a wide temperature range under constant pressure conditions so as to create a temperature glide in the evaporator which can be exploited to reduce the energy required to operate the heat transfer device, e.g. by making use of the Lorentz cycle. One technique for expliciting the temperature glide involves the use of a heat transfer device equipped with a counter current flow evaporator and/or condenser in which the refrigerant and the heat transfer fluid are caused to flow counter currently to each other. With such an arrangement, it is possible to minimise the temperature difference between the evaporating and condensing refrigerant whilst maintaining a sufficiently high temperature difference between the refrigerant and the external fluid(s) to cause the required heat transfer to take place.

The consequence of minimising the temperature difference between the evaporating and condensing refrigerant in the same system is that the pressure difference is also minimised. As a result, the overall energy efficiency of the system is improved as less energy is consumed to bring about the refrigerant pressure rise from evaporator to condenser conditions.

This increase in the energy efficiency can be optimised by using a zeotropic refrigerant composition which boils and condenses over a temperature range which is equal or approximately equal to the temperature change to which the heat transfer fluid is to be subjected as it flows through the evaporator and condenser.

The zeotropic composition of the present invention may be used to provide the desired cooling in heat transfer devices such as automobile air conditioning and domestic refrigeration systems by a method which involves condensing the composition and thereafter evaporating it in a heat exchange relationship with a heat transfer fluid to be cooled. In particular, the composition of the invention may be employed as a replacement for refrigerant R-12 in automobile air conditioning and domestic refrigeration systems.

In addition to its use as a refrigerant, the composition of the invention may also be used as an aerosol propellant, as a foam blowing agent for blowing polyolefin, polyurethane and related foams, or as a solvent in degreasing or extraction applications.

The present invention is now illustrated but not limited with reference to the following examples.

EXAMPLE 1

The performance of six refrigerant compositions of the invention in a refrigeration cycle was evaluated using standard refrigeration cycle analysis techniques in order to assess the suitability thereof as a replacement for R-12. The operating conditions which were used for the analysis were chosen as being typical of those conditions which are found in an automobile air conditioning system, and counter current flow at the heat exchangers was assumed.

The evaluation involved first defining the inlet and outlet temperatures of the heat transfer fluid, which could be air or water for example, at each heat exchanger (evaporator and condenser). The temperatures in the evaporator and condenser, assuming that a pure (single component) refrigerant was used in the cycle, were then chosen and these temperatures together with the inlet and outlet temperatures of the heat transfer fluid referred to above were used to determine a target log mean temperature difference for each heat exchanger. In the cycle analysis itself, the refrigerant inlet and outlet temperatures at both the evaporator and condenser were adjusted until the target log mean temperature difference was achieved for each heat exchanger. When the target log mean temperature difference for each heat exchanger was achieved, the various properties of the refrigerant composition in the cycle were recorded.

The following refrigerant compositions were subjected to the cycle analysis:

(1) A composition comprising 5% by weight $CO_2$, 85% by weight R-134a and 10% by weight R-236fa.
(2) A composition comprising 2% by weight $CO_2$, 93% by weight R-134a and 5% by weight R-236fa.
(3) A composition comprising 5% by weight $CO_2$, 90% by weight R-134a and 5% by weight R-236fa.
(4) A composition comprising 2% by weight $CO_2$, 88% by weight R-134a and 10% by weight R-236fa.
(5) A composition comprising 2% by weight $CO_2$, 91% by weight R-134a and 7% by weight R-236fa.
(6) A composition comprising 2% by weight $CO_2$, 95% by weight R-134a and 3% by weight R-236fa.

The following operating conditions were used in the cycle analysis.

| EVAPORATOR: | |
|---|---|
| Evaporator Temperature: | −10° C. |
| Inlet Temperature of Heat Transfer Fluid | 20° C. |
| Outlet Temperature of Heat Transfer Fluid | 12° C. |
| Log Mean Temperature Difference for Evaporator | 24.66° C. |
| CONDENSER: | |
| Condenser Temperature: | 40° C. |
| Inlet Temperature of Heat Transfer Fluid | 20° C. |
| Outlet Temperature of Heat Transfer Fluid | 30° C. |
| Log Mean Temperature Difference for Condenser | 14.43° C. |
| Amount of Superheat: | 10° C. |
| Amount of Subcooling: | 5° C. |
| Isentropic Compressor Efficiency: | 80% |
| Volumetric Flow through Compressor | 1 $m^3/s$ |

The results of analysing the performance of the six refrigerant compositions in a refrigeration cycle using these operating conditions are given in Table 1.

The performance parameters of the refrigerant compositions which are presented in Table 1 and in the tables which follow, i.e. condenser pressure, evaporator pressure, discharge temperature, refrigeration capacity (by which is meant the cooling duty achieved per unit swept volume of the compressor), coefficient of performance (COP) (by which is meant the ratio of cooling duty achieved to mechanical energy supplied to the compressor), and the glides in the evaporator and condenser (the temperature range over which the refrigerant composition boils in the evaporator and condenses in the condenser), are all art recognised parameters.

The performance of refrigerant R-12 under the same operating conditions is also shown in Table 1 by way of comparison.

It is apparent from Table 1 that refrigerant compositions of the invention containing $CO_2$, R-134a and R-236fa boil over a wide temperature range in the evaporator and condense over a wide temperature range in the condenser, i.e. they exhibit wide glide behaviour in both heat exchangers.

It is also apparent from Table 1 that the refrigerant compositions tested had higher refrigeration capacities than R-12 and comparable coefficients of performance.

It is further evident from the results given in Table 1 that refrigerant compositions of the invention containing $CO_2$, R-134a and R-236fa could make an acceptable replacement for refrigerant R-12.

EXAMPLE 2

The performance of six refrigerant compositions of the invention in a refrigeration cycle was evaluated using exactly the same technique and exactly the same operating conditions as described in Example 1.

The following refrigerant compositions were subjected to the cycle analysis:

(1) A composition comprising 5% by weight $CO_2$, 85% by weight R-134a and 10% by weight R-236ea.
(2) A composition comprising 2% by weight $CO_2$, 93% by weight R-134a and 5% by weight R-236ea.
(3) A composition comprising 5% by weight $CO_2$, 90% by weight R-134a and 5% by weight R-236ea.
(4) A composition comprising 2% by weight $CO_2$, 88% by weight R-134a and 10% by weight R-236ea.
(5) A composition comprising 2% by weight $CO_2$, 91% by weight R-134a and 7% by weight R-236ea.
(6) A composition comprising 2% by weight $CO_2$, 86% by weight R-134a and 12% by weight R-236ea.

The results of analysing the performance of these six refrigerant compositions in a refrigeration cycle are in Table 2.

The performance of refrigerant R-12 under the same operating conditions is also shown in Table 2 by way of comparison.

It is apparent from Table 2 that refrigerant compositions of the invention containing $CO_2$, R-134a and R-236ea boil over a wide temperature range in the evaporator and condense over a wide temperature range in the condenser, i.e. they exhibit wide glide behaviour in both heat exchangers.

It is also apparent from Table 2 that most of the refrigerant compositions tested had higher refrigeration capacities than R-12 and comparable coefficients of performance.

It is further evident from the results given in Table 2 that refrigerant compositions of the invention containing $CO_2$, R-134a and R-236ea could make an acceptable replacement for refrigerant R-12.

EXAMPLE 3

The performance of three refrigerant compositions of the invention in a refrigeration cycle was evaluated using exactly the same technique and exactly the same operating conditions as described in Example 1.

The following refrigerant compositions were subjected to the cycle analysis:

(1) A composition comprising 5% by weight R-32, 90% by weight R-134a and 5% by weight R-236fa.
(2) A composition comprising 10% by weight R-32, 85% by weight R-134a and 5% by weight R-236fa.
(3) A composition comprising 5% by weight R-32, 85% by weight R-134a and 10% by weight R-236fa.

The results of analysing the performance of these three refrigerant compositions in a refrigeration cycle are given in Table 3.

The performance of refrigerant R-12 under the same operating conditions is also shown in Table 3 by way of comparison.

It is apparent from Table 3 that refrigerant compositions of the invention containing R-32, R-134a and R-236fa boil over a temperature range in the evaporator and condense over a temperature range in the condenser, i.e. they exhibit temperature glides in both heat exchangers.

It is also apparent from Table 3 that the refrigerant compositions tested had higher refrigeration capacities than R-12 and comparable coefficients of performance.

It is further evident from the results given in Table 3 that refrigerant compositions of the invention containing R-32, R-134a and R-236fa could make an acceptable replacement for refrigerant R-12.

EXAMPLE 4

The performance of three refrigerant compositions of the invention in a refrigeration cycle was evaluated using exactly the same technique and exactly the same operating conditions as described in Example 1.

The following refrigerant compositions were subjected to the cycle analysis:

(1) A composition comprising 5% by weight R-32, 90% by weight R-134a and 5% by weight R-236ea.
(2) A composition comprising 10% by weight R-32, 85% by weight R-134a and 5% by weight R-236ea.
(3) A composition comprising 5% by weight R-32, 85% by weight R-134a and 10% by weight R-236ea.

The results of analysing the performance of these three refrigerant compositions in a refrigeration cycle are given in Table 4.

The performance of refrigerant R-12 under the same operating conditions is also shown in Table 4 by way of comparison.

TABLE 4

| Refrigerant % by weight | R-12 | R-32/ R-134a/ R-236ea 5/90/5 | R-32/ R-134a/ R-236ea 10/85/5 | R-32/ R-134a/ R-236ea 5/85/10 |
|---|---|---|---|---|
| Evaporator Pressure (bar) | 2.19 | 2.09 | 2.28 | 1.98 |
| Condenser Pressure (bar) | 9.6 | 10.56 | 11.42 | 10.14 |
| Discharge Temperature (° C.) | 67.52 | 67.71 | 71.22 | 67.76 |
| Coefficient of Performance (COP) | 3.3 | 3.29 | 3.3 | 3.3 |
| COP Relative to R-12 | 1 | 1 | 1 | 1 |
| Refrigeration Capacity (KW/m$^3$) | 1,408.45 | 1,470.59 | 1,587.3 | 1,408.45 |
| Refrigeration Capacity Relative to R-12 | 1 | 1.04 | 1.13 | 1 |
| Evaporator Glide (° C.) | 0 | 2.73 | 3.90 | 4.04 |
| Condenser Glide (° C.) | 0 | 3.35 | 4.9 | 4.62 |

It is apparent from Table 4 that refrigerant compositions of the invention containing R-32, R-134a and R-236ea boil over a temperature range in the evaporator and condense over a temperature range in the condenser, i.e. they exhibit temperature glides in both heat exchangers.

It is also apparent from Table 4 that two of the three refrigerant compositions tested had higher refrigeration capacities than R-12 while the third composition had the same refrigeration capacity as R-12. All the compositions tested had similar coefficients of performance to R-12.

It is further evident from the results given in Table 4 that refrigerant compositions of the invention containing R-32, R-134a and R-236ea could make an acceptable replacement for refrigerant R-12.

TABLE 1

| Refrigerant % by weight | R-12 | CO$_2$/R-134a/R-236fa 5/85/10 | CO$_2$/R-134a/R-236fa 2/93/5 | CO$_2$/R-134a/R-236fa 5/90/5 |
|---|---|---|---|---|
| Evaporator Pressure (bar) | 2.19 | 2.34 | 2.12 | 2.44 |
| Condenser Pressure (bar) | 9.6 | 1315 | 11.17 | 33.4 |
| Discharge Temperature (° C.) | 67.52 | 75.76 | 68.58 | 75.63 |
| Coefficient of Performance (COP) | 3.3 | 3.19 | 3.25 | 3.2 |
| COP Relative to R-12 | 1 | 0.97 | 0.98 | 0.97 |
| Refrigeration Capacity (KW/m$^3$) | 1,408.45 | 1,694.92 | 1,492.54 | 1,754.39 |
| Refrigeration Capacity Relative to R-12 | 1 | 1.2 | 1.06 | 1.25 |
| Evaporator Glide (° C.) | 0 | 7.57 | 3.05 | 6.66 |
| Condenser Glide (° C.) | 0 | 17.17 | 7.96 | 15.88 |

| Refrigerant % by weight | CO$_2$/R-134a/R-236fa 2/88/10 | CO$_2$/R-134a/R-236fa 2/91/7 | CO$_2$/R-134a/R-236fa 2/95/3 |
|---|---|---|---|
| Evaporator Pressure (bar) | 2.03 | 2.08 | 2.15 |
| Condenser Pressure (bar) | 10.87 | 11.05 | 11.29 |
| Discharge Temperature (° C.) | 68.41 | 58.52 | 68.63 |
| Coefficient of Performance (COP) | 3.25 | 3.25 | 3.25 |
| COP Relative to R-12 | 0.98 | 0.98 | 0.98 |
| Refrigeration Capacity (KW/m$^3$) | 1,449.28 | 1,470.59 | 1,515.15 |
| Refrigeration Capacity Relative to R-12 | 1.03 | 1.04 | 1.08 |
| Evaporator Glide (° C.) | 3.86 | 3.38 | 2.71 |
| Condenser Glide (° C.) | 8.97 | 8.36 | 7.55 |

TABLE 2

| Refrigerant % by weight | R-12 | CO$_2$/R-134a/R-236ca 5/85/50 | CO$_2$/R-134a/R-236ca 2/93/5 | CO$_2$/R-134a/R-236ca 5/90/5 |
|---|---|---|---|---|
| Evaporator Pressure (bar) | 2.19 | 2.28 | 2.09 | 2.4 |
| Condenser Pressure (bar) | 9.6 | 12.98 | 11.07 | 13.31 |
| Discharge Temperature (° C.) | 67.52 | 76.84 | 69.04 | 76.2 |
| Coefficient of Performance (COP) | 3.3 | 3.19 | 3.25 | 3.2 |

TABLE 2-continued

| | | | | |
|---|---|---|---|---|
| COP Relative to R-12 | 1 | 0.96 | 0.98 | 0.97 |
| Refrigeration Capacity (KW/m$^3$) | 1,408.45 | 1,666.67 | 1,492.53 | 1,724.14 |
| Refrigeration Capacity Relative to R-12 | 1 | 1.18 | 1.06 | 1.22 |
| Evaporator Glide (° C.) | 0 | 8.66 | 3.61 | 7.25 |
| Condenser Glide (° C.) | 0 | 18.23 | 8.46 | 16.42 |

| Refrigerant % by weight | $CO_2$/R-134a/R-236ca 2/88/10 | $CO_2$/R-134a/R-236ca 2/91/7 | $CO_2$/R-134a/R-236ca 2/86/52 |
|---|---|---|---|
| Evaporator Pressure (bar) | 1.98 | 2.04 | 1.93 |
| Condenser Pressure (bar) | 10.69 | 10.91 | 10.54 |
| Discharge Temperature (° C.) | 69.27 | 69.14 | 69.34 |
| Coefficient of Performance (COP) | 3.26 | 3.26 | 326 |
| COP Relative to R-12 | 0.99 | 0.99 | 0.99 |
| Refrigeration Capacity (KW/m$^3$) | 1,428.57 | 1.470.59 | 1,408.45 |
| Refrigeration Capacity Relative to R-12 | 1.01 | 1.04 | 1 |
| Evaporator Glide (° C.) | 4.89 | 4.14 | 5.35 |
| Condenser Glide (° C.) | 9.93 | 9.05 | 10.51 |

TABLE 3

| Refrigerant % by weight | R-12 | R-32/ R-134a/ R-236fa 5/90/5 | R-32/ R-134a/ R-236fa 10/85/5 | R-32/ R-134a/ R-236fa 5/85/10 |
|---|---|---|---|---|
| Evaporator Pressure (bar) | 2.19 | 2.12 | 2.31 | 2.03 |
| Condenser Pressure (bar) | 9.6 | 10.66 | 11.53 | 10.35 |
| Discharge Temperature (° C.) | 67.52 | 67.3 | 70.79 | 67.03 |
| Coefficient of Performance (COP) | 3.3 | 3.28 | 3.29 | 3.29 |
| COP Relative to R-12 | 1 | 0.99 | 1 | 1 |
| Refrigeration Capacity (KW/m$^3$) | 1,408.45 | 1,470.59 | 1,612.9 | 1,428.57 |
| Refrigeration Capacity Relative to R-12 | 1 | 1.04 | 1.15 | 1.01 |
| Evaporator Glide (° C.) | 0 | 2.17 | 3.34 | 3.01 |
| Condenser Glide (° C.) | 0 | 2.89 | 4.42 | 3.72 |

What is claimed is:

1. A comprising:
   (A) carbon dioxide ($CO_2$);
   (B) at least one hydrofluorocarbon selected from the group consisting of 1,1,1,2-tetrafluoroethane (R-134a), 1,1,2,2-tetrafluoroethane (R-134), and 1,1-difluoroethane (R-152a); and
   (C) at least one hydrofluorocarbon selected from the group consisting of 1,1,1,3,3,3-hexafluoropropane (R-236fa) and 1,1,1,2,3,3 hexafluoropropane (R-236ea).

2. A composition as claimed in claim 1 comprising:
   (A) from 1 to 30% by weight of $CO_2$;
   (B) from 60 to 97% by weight of at least one hydrofluorocarbon selected from the group consisting of R-134a, R-134 and R-152a; and
   (C) from 1 to 30% by weight of at least one hydrofluorocarbon selected from the group consisting of R-236fa and R-236ea.

3. A composition as claimed in claim 1 or claim 2, wherein component (B) is R-134a.

4. A composition as claimed in claim 3 comprising from 1 to 10% by weight of $CO_2$, from 75 to 97% by weight of R-134a and from 1 to 20% by weight of R-236fa, R-236ea or a mixture thereof.

5. A composition as claimed in claim 4 comprising from 1 to 7% by weight of $CO_2$, from 80% to 97% by weight of R-134a and from 2 to 15% by weight of R-236fa, R-236ea or a mixture thereof.

6. A composition as claimed in claim 5 comprising from 1 to 5% by weight of $CO_2$, from 85 to 97% by weight of R-134a and from 2 to 13% by weight of R-236fa, R-236ea or a mixture thereof.

7. A composition as claimed in claim 6 comprising about 2% by weight of $CO_2$, about 95% by weight of R-134a and about 3% by weight of R-236fa.

8. A composition as claimed in claim 6 comprising about 2% by weight of $CO_2$, about 91% by weight of R-134a and about 7% by weight of R-236ea.

9. A composition as claimed in claim 1 which additionally comprises at least one hydrocarbon.

10. A composition as claimed in claim 9, wherein the at least one hydrocarbon comprises pentane.

11. A composition as claimed in claim 9 or claim 10 wherein the hydrocarbon is present in an amount of from 1 to 10% by weight on the total weight of the composition.

12. A heat transfer device comprising an evaporator, a compressor, a condenser and expansion means which contains as the refrigerant a composition as claimed in claim 1.

13. An automobile air conditioning or domestic refrigeration system which comprises an evaporator, a compressor, a condenser and expansion means and which contains as the refrigerant a composition as claimed in claim 1.

14. A method for providing cooling which comprises condensing a composition as claimed in claim 1 and thereafter evaporating it in a heat exchange relationship with a heat transfer fluid to be cooled.

15. In a refrigeration process wherein a refrigerant composition is condensed and thereafter evaporated by heat exchange with a heat transfer fluid to be cooled, wherein the improvement comprises employing the refrigerant composition of claim 1.

* * * * *